United States Patent [19]
Kapolyi et al.

[11] 4,226,632
[45] Oct. 7, 1980

[54] PROCESS FOR PRODUCING HIGH-PURITY ALUMINA AND HYDRAULIC CEMENT

[75] Inventors: Laszlo Kapolyi, Budapest; Geza Szentgyörgyi, Tatabánya; György Vamos, Budapest, all of Hungary; Jerzy Grzymek, Warsaw, Poland; Anna D. Grzymek, Cracow, Poland; Stanislaw Bethke; Bronislaw Werynski, both of Opole, Poland

[73] Assignee: Tatabányai Szénbányák, Tatabánya, Hungary

[21] Appl. No.: 942,962

[22] Filed: Sep. 18, 1978

Related U.S. Application Data

[63] Continuation of Ser. No. 731,370, Oct. 12, 1976, abandoned.

[51] Int. Cl.$^2$ ................................................ C04B 7/36
[52] U.S. Cl. ..................... 106/100; 106/103; 423/119
[58] Field of Search ................ 106/100, 103; 423/111, 423/115, 119

[56] References Cited

U.S. PATENT DOCUMENTS

| | | | |
|---|---|---|---|
| 2,242,258 | 5/1941 | Noll | 423/119 |
| 2,452,041 | 10/1948 | Elmore | 423/115 |
| 3,876,749 | 4/1975 | Horvath et al. | 423/119 |

*Primary Examiner*—James Poer

[57] ABSTRACT

A low grade aluminum and silicon containing starting material is intimately mixed with limestone and the resultant mixture is fluidized. The fluidized mixture is preheated to a temperature of 700° to 900° C., then held at sintering temperature for 5 to 10 minutes. Aluminum may be recovered by extraction of the sintered powder so produced.

10 Claims, No Drawings

PROCESS FOR PRODUCING HIGH-PURITY ALUMINA AND HYDRAULIC CEMENT

Continuation of Ser. No. 731,370, filed on Oct. 12, 1976, now abandoned.

The present invention involves a process for producing high-purity alumina and hydraulic cement from low-grade aluminum containing starting materials. The process is based on phase conversion of dicalcium silicate. A heat exchanger coupled with a sintering furnace are employed.

Several methods are known in the art for recovering the aluminum content of such low-grade aluminum containing materials as low-grade bauxite, coal slag, fly ash, clay etc. However, only a few of such methods are economical. Commercial feasibility has been established only for those processes based on the phase conversion of disintegrating dicalcium silicate and producing alumina and hydraulic cement from the end product so obtained. In such processes, at high temperature, a reaction takes place between the aluminum containing starting material and the limestone. The chemical and physical characteristics of the resultant mixture permit the aluminum content to be recovered, at normal pressure and at relatively low temperature, by extraction with soda solution. In principle, the reaction can be brought about in both the liquid and solid phase. Accordingly, the methods used are melting or sintering. From a physical and chemical point of view, such processes utilize the polymorphy of dicalcium silicates; a property which produces an increase in the volume of the system. Such volume increase is attributable to the about 10% difference between the molar volume of the $\beta$ and $\gamma$ modifications. After heat treatment, a conversion between the two modifications takes place during the course of cooling of the dicalcium silicate. The stress brought about by the volume increase causes the sintered cake to disintegrate into a powder which, for the most part, has a grain size below $25\mu$. In this manner, a powdered product, which is ready for caustic extraction, can be obtained without external power input. Another advantage of this process is that the major part of the silicate contained in the raw material is converted into $\gamma$-dicalcium silicate which has very poor solubility in dilute soda solution. The aluminate liquor, which forms in addition to the $\gamma$-dicalcium silicate, has very good solubility in water. Advantageously, the aluminate liquor, prepared from calcium aluminate, is only to a low extent contaminated with silica.

Several methods, such as heretofor described, are known in the art. For example, Hungarian Pat. No. 94.665 discloses the production of a self disintegrating hydraulic cement which contains aluminum. Hungarian Pat. Nos. 122.738 and 140.323 disclose the production of water-soluble calcium aluminates and alumina, respectively. The phenomenon of disintegration is also mentioned, but only in respect of the mixing and cooling of the substance-mixture. Hungarian Pat. No. 148.401 treats with theoretical problems of phase conversion and suggests a practical way to utilize the phenomenon of disintegration. Such phenomenon is also mentioned, but not discussed in detail, in German Pat. Nos. 824.197, 906.218, and 935.431. German Pat. No. 1020.612, discloses the production of alumina and hydraulic cement out of clinker containing disintegrating dicalcium silicate. This patent also treats with the problem of grain distribution; however, the coarse faction is considered to be advantageous in respect of alumina production. Hungarian Pat. No. 162.162 discusses the inactivation of disintegration inhibitors by addition of desoxidizing metals to the substance system.

When carried out on a large scale, each of the aforementioned methods employs sintering in a rotary kiln. In these conventional methods of sintering it is difficult to properly control the clinkerizing reactions. This is due to the fact that a saturated state, which would be optimal in respect of the dicalcium-silicate/dodecacalcium heptaaluminate phases to be formed in homogeneous solid-phase reactions, cannot be fully attained. Features of prior art rotary-kiln processes prevent one from even approaching the ideal composition. On the one hand, the total amount of dicalcium silicate is inherently less and complete $\beta$ to $\gamma$ conversion will not take place with such reduced amount. On the other hand, gehlenit (dicalcium aluminum silicate), which acts as an inhibitor of disintegration, is always formed in such processes and adversely affects aluminum recovery.

Hence, in such known processes, it would be desireable to control, after proper adjustment of the composition of the starting mixture, the kinetics of the mineralogical process taking place, so that a product composed of dicalcium-silicate/dodecacalcium heptaaluminate will be obtained and the degree of conversion into the $\gamma$-modification is increased. This will, as a consequence, improve the aluminum recovery, reduce the silica contamination of the aluminate liquor and enable one to obtain high-purity alumina as an end product. To achieve this, maximum degree of conversion of the silicon content of the sintered cake into $\gamma$-dicalcium silica modification and an end product having small grain size is required. The latter is ensured through intensified disintegration.

The present invention relates to a process wherein limestone and a fine-grain mixture composed of low-grade aluminum containing materials such as coal slag, fly ash, low gradebauxite, red mud and clay, are pulverized, preferably together. The pulverized mixture is heated to 700°–900° C. under fluidization, preferably in a heat exchange system. The mixture is then maintained at sintering temperature for 5 to 10 minutes, in a furnace, whereby the $\gamma$-modification of dodecacalcium-heptaaluminate and dicalcium silicate is predominantly formed from the dicalcium silicate content of the sintered product. The aluminum content of the disintegrating material is extracted to produce high-purity slumina from the aluminate solution which is poor in silica. Hydraulic cement is produced from the residue.

Limestone is added to the aluminum containing starting material, employed as the starting mixture of the process of the present invention. Limestone is added in a ratio permitting the total silicon and aluminum content of the sintered cake to convert into dicalcium silicate and dodecacalcium heptaaluminate, respectively. Expediently, the starting materials are so pulverized that, according to sieve analysis, the fraction above $88\mu$ is below 10%. This substance-mixture is heated to 700° to 900° C., by direct heat exchange or counter-flow exchange preferably in countercurrent with the hot flue gases of the kiln, by heat exchange with the aid of fluidization mixing. During this preheating step, certain favorable results are obtained from the standpoint of the subsequent sintering. For example, the grains of pulverized limestone and aluminum containing starting material are homogenized, partial decarbonization of the limestone occurs, and, due to the uniformity of heating, a porous and spongy product, which is homogeneous both physically and chemically, is formed. As a result of the preheating step solid-phase reactions occur intensively and homogeneously and in the sintering step a residence time of the preheated mixture in the rotary kiln as short, as 5 to 10 minutes, is made possible. Thus, it is generally possible to very uniformly heat up to sintering temperature (1260° to 1360° C.) as much as the total amount of material. As a result, the sintering operation, which would otherwise be rather sensible, is not only simple but surprisingly short. The conversion, is ended when the total amount of the material calculated is converted into dicalcium silicate and dodecacalcium heptaaluminate, thus preventing formation of gehlenit ($Ca_2Al_2SiO_7$) a compound which has only deleterious effects in conventional rotary-kiln processes. In rotary kilns, the longer residence time at sintering temperature greatly contributes to gehlenit formation.

In the process of the present invention, there is a very intensive contact between the porous material leaving the heat exchanger and entering the rotary kiln and the slightly reducing atmosphere of the kiln. As a result, the favorable effect of the Fe(II)-ion, produced in the slightly reducing atmosphere, upon the beta to gamma transition of dicalcium silicate, can be utilized. A dual advantage is offered by the fact that since desirable reactions take place quantitatively, the phase conversion which causes the dicalcium slicate to disintegrate is more complete that in known processes. First, as compared with the product of conventional sintering processes, the overall grain size of the powder produced by disintegration is significantly smaller. In point of fact the major part of the disintegrated product has a granular size of about below 20 microns. Thus the extraction time and the danger of dissolving the silica in the liquor is decreased. On the other hand, due to the decreased content of the $\beta$-modification, a smaller amount of silica can dissolve in aluminate liquor. This is due to the relative water insolubility of the predominating $\gamma$-modification as compared with the hydrophyllic $\beta$-modification. These advantages enable one to produce high-purity alumina having low silica content.

The following Example is presented to illustrate the process of the present invention:

Forty-four tons of fly ash and 124 tons of limestone are ground and subjected to dry homogenization. The resultant mixture is fed to a heat exchanger, then to a rotary kiln. Chemical analysis of the starting substance is as follows:

|  | $Al_2O_3$ | $SiO_2$ | CaO | $Fe_2O_3$ | $Na_2O$ | MgO | Halogen |
|---|---|---|---|---|---|---|---|
| Fly ash % | 31.0 | 45.0 | 6.0 | 8.0 | 1.6 | 1.2 | 0.3 |
| Limestone % | 0.5 | 0.7 | 53.4 | 0.2 | 0.2 | 0.8 | 0.01 |

The mixture (composed of spongy lumps) leaving the heat exchanger had a temperature of 900° C. Such material was then passed over a period of ten minutes, through the 1260° C. sintering part of the kiln. The sintered cake leaving the kiln disintegrated into a fine powder during cooling (at a temperature of 270° to 180° C.).

Grain size distribution of the powder so produced is as follows:

| grain size in $\mu$ | % |
|---|---|
| 0 to 5 | 14.0 |
| 5 to 10 | 26.0 |
| 10 to 15 | 29.0 |
| 15 to 20 | 15.0 |
| 20 to 25 | 4.0 |
| 25 to 30 | 2.5 |
| 30 to 40 | 2.0 |
| 40 to 50 | 1.0 |
| 50 to 60 | 0.5 |
| >60 | 6.0 |

Mineral content of the disintegrating product is as follows:

| dicalcium silicate | 58% |
|---|---|
| $\beta$-modification | below 2% |
| dodecacalcium heptaaluminate | 24% |

A very short time (not more than 10 minutes) was sufficient to extract, in the known manner, using soda solution, practically all of the disintegrating product. Due to the short extraction time and the fact that dicalcium silicate was predominantly present in the $\gamma$-modification, the amount of dissolved silica was not more than 60 mg/l. As a result, an extremely pure alumina was obtained from the aluminate liquor, by conventional means. Percent distribution of impurities in the alumina is as follows:

| $SiO_2$ | 0.014% |
|---|---|
| $Fe_2O_3$ | 0.012% |
| $TiO_2$ | 0.005% |
| $P_2O_5$ | 0.006% |
| $V_2O_5$ | 0.005% |
| $Na_2O$ | 0.110% |

9.8 tons of alumina and 121 tons of extraction residue were produced. The residue was sintered in accordance with the method employed in the production of hydraulic cement. Upon the addition thereto of 5% gypsum, 109 tons of portland 600 quality hydraulic cement were produced.

We claim:

1. In a process for recovering aluminum from a low grade aluminum and silicon containing starting material by sintering the starting material with limestone to produce a reaction product containing dicalcium silicate, cooling the reaction product whereby phase conversion of the dicalcium silicate causes the reaction product to disintegrate and subjecting the disintegrated product to alkaline extraction, wherein the improvement comprises the starting material and limestone are intimately mixed; the mixture of starting material and limestone is fluidized and preheated in the fluidized state to a temperature of 700° to 900° C. by heat exchange; then the preheated mixture is held at sintering temperature for 5 to 10 minutes in said sintering step.

2. Process, as claimed in claim 1, wherein said preheating is by direct heat exchange.

3. Process, as claimed in claim 1, wherein said preheating is by counterflow heat exchange.

4. Process, as claimed in claim 1, wherein said sintering step is carried out in a rotary kiln.

5. Process, as claimed in claim 1, wherein the starting material is pulverized so that less than 10% of it has a grain size over 88 microns.

6. Process, as claimed in claim 4, wherein said preheating is carried out by contacting the fluidized mixture, countercurrently with hot flue gases of the kiln.

7. Process, as claimed in claim 1, wherein said limestone is present in an amount sufficient to permit conversion of the silicon and aluminum content of the starting material into dicalcium silicate and dodecacalcium heptaaluminate, respectively.

8. Process, as claimed in claim 1, wherein the sintering temperature is 1260° to 1360° C.

9. Process, as claimed in claim 1, wherein the dicalcium silicate upon sintering is converted to the γ-modification and the major part of the disintegrated product has a granular size of about below 20 microns.

10. Process, as claimed in claim 1, wherein aluminum recovered in said alkaline extraction is converted to alumina and residue of said extraction is used in the production of hydraulic cement.

* * * * *